(12) United States Patent  
Davis et al.

(10) Patent No.: US 12,221,754 B2  
(45) Date of Patent: Feb. 11, 2025

(54) RECYCLED RUBBER BARRIER

(71) Applicant: Pretred LTD., Aurora, CO (US)

(72) Inventors: Eric Davis, Lakewood, CO (US); Richard K. Welle, IV, Centennial, CO (US)

(73) Assignee: PRETRED, INC., Aurora, CO (US)

( * ) Notice: Subject to any disclaimer, the term of this patent is extended or adjusted under 35 U.S.C. 154(b) by 0 days.

(21) Appl. No.: 14/976,151

(22) Filed: Dec. 21, 2015

(65) Prior Publication Data

US 2017/0175349 A1     Jun. 22, 2017

(51) Int. Cl.
| | |
|---|---|
| *B29C 43/18* | (2006.01) |
| *B29B 17/00* | (2006.01) |
| *B29C 43/52* | (2006.01) |
| *B29K 105/26* | (2006.01) |
| *B29L 30/00* | (2006.01) |

(Continued)

(52) U.S. Cl.
CPC ........ *E01F 15/086* (2013.01); *B29B 17/0042* (2013.01); *B29C 43/18* (2013.01); *B29C 43/52* (2013.01); *B32B 1/00* (2013.01); *B32B 3/14* (2013.01); *E01F 15/083* (2013.01); *E01F 15/141* (2013.01); *B29C 2043/182* (2013.01); *B29K 2105/26* (2013.01); *B29L 2030/00* (2013.01); *B32B 2264/0207* (2013.01);

(Continued)

(58) Field of Classification Search
CPC ........ E01F 15/00; E01F 15/086; E01F 15/02; B32B 2571/00; B32B 2571/02; B32B 2264/0207; B32B 2305/70; B32B 2307/558; B32B 2307/56; B32B 1/02; B32B 1/06; B29C 43/18; B29L 2105/768; B29L 2031/768; B29B 17/0026; B29B 17/0042; B29K 2075/00; B29K 2009/00; B29K 2009/06; B29K 2105/26; B29K 2021/00; E04B 1/98
USPC ................... 428/36.8, 34.1–36.92; 404/6–8; 264/109–128, 239, 241, 319, 337
See application file for complete search history.

(56) References Cited

U.S. PATENT DOCUMENTS 3,317,189 A * 5/1967 Rubenstein ......... E01F 15/0453  
52/DIG. 7  
3,876,185 A * 4/1975 Welch .................. E01F 15/146  
256/1

(Continued)

FOREIGN PATENT DOCUMENTS

| DE | 201 16 169 U1 * | 3/2003 | ............. E01F 15/14 |
| EP | 2045063 A1 * | 4/2009 | ......... B29B 17/0042 |

(Continued)

OTHER PUBLICATIONS

International Search Report and Written Opinion, PCT/US2016/067878, dated Mar. 16, 2017, 13 pages.

*Primary Examiner* — Michael C Romanowski  
(74) *Attorney, Agent, or Firm* — HOLLAND & HART LLP

(57) ABSTRACT

A barrier includes recycled rubber portions molded around a core infrastructure. The core infrastructure may itself include recycled rubber in a containment body. The containment body may include baled recycled or other waste material. The barriers may be stacked or connected to form a barrier structure useful in environmental control and other applications. The method for making the barriers includes molding rubber portions and a binder around a core infrastructure.

17 Claims, 14 Drawing Sheets

(51) Int. Cl.
*B32B 1/00* (2024.01)
*B32B 3/14* (2006.01)
*E01F 15/00* (2006.01)
*E01F 15/08* (2006.01)
*E01F 15/14* (2006.01)

(52) U.S. Cl.
CPC ..... *B32B 2307/558* (2013.01); *B32B 2571/00* (2013.01); *E01F 15/00* (2013.01)

(56) References Cited

U.S. PATENT DOCUMENTS

| | | | | |
|---|---|---|---|---|
| 3,951,384 | A * | 4/1976 | Hildreth, Jr. | E01F 15/003 114/219 |
| 4,086,015 | A * | 4/1978 | Eliasson | E01F 8/025 404/6 |
| 4,643,271 | A * | 2/1987 | Coburn | E01F 15/085 52/DIG. 9 |
| 4,772,155 | A * | 9/1988 | Dinitz | E01F 9/669 404/6 |
| 5,054,954 | A * | 10/1991 | Cobb | E01F 15/085 404/6 |
| 5,106,554 | A * | 4/1992 | Drews | B29B 17/0042 264/112 |
| 5,172,528 | A * | 12/1992 | Clarke | E04B 1/00 428/903.3 |
| 5,254,405 | A * | 10/1993 | Panaroni | C08L 75/04 428/327 |
| 5,292,467 | A * | 3/1994 | Mandish | E01F 15/0476 428/903.3 |
| 5,316,708 | A * | 5/1994 | Drews | B29B 17/0042 264/109 |
| 5,336,016 | A | 8/1994 | Baatz | |
| 5,360,286 | A | 11/1994 | Russell | |
| 5,714,219 | A * | 2/1998 | Mashunkashey | B32B 5/16 156/95 |
| 6,086,285 | A * | 7/2000 | Christensen | E01F 13/022 256/1 |
| 6,319,609 | B1 * | 11/2001 | Eriksson | E01F 8/0088 428/407 |
| 6,540,434 | B1 * | 4/2003 | Hotchkin | E01F 15/145 404/9 |
| 8,545,126 | B1 * | 10/2013 | Alsaffar | E01F 15/086 404/6 |
| 2002/0025221 | A1 * | 2/2002 | Johnson | E01F 15/086 404/6 |
| 2004/0121100 | A1 * | 6/2004 | Potempa | E01F 8/0076 428/35.7 |
| 2005/0158119 | A1 * | 7/2005 | Yodock | E01F 15/0453 404/6 |
| 2006/0024453 | A1 * | 2/2006 | Setser | B29B 17/0042 264/319 |
| 2012/0020730 | A1 * | 1/2012 | Chow | E01C 15/00 404/34 |
| 2013/0108361 | A1 * | 5/2013 | Mustafa | E01F 15/141 404/6 |
| 2014/0175185 | A1 * | 6/2014 | Cialone | B29C 43/18 238/85 |
| 2014/0228503 | A1 * | 8/2014 | Cialone | E01B 3/46 525/131 |
| 2014/0316031 | A1 * | 10/2014 | Al-Aqeeli | C08G 59/5006 523/438 |
| 2015/0337508 | A1 * | 11/2015 | Torres, Jr. | F21S 9/032 404/6 |
| 2016/0237260 | A1 | 8/2016 | Welle, IV | |

FOREIGN PATENT DOCUMENTS

| | | | | |
|---|---|---|---|---|
| GB | 2221941 A | * | 2/1990 | ............ E01F 15/083 |
| GB | 2278619 A | * | 12/1994 | ............ B29C 43/18 |
| JP | H07127025 A | | 5/1995 | |
| WO | WO 97/41308 | * | 11/1997 | ............ E01F 15/14 |
| WO | WO 01/46525 | * | 6/2001 | ............ E01F 15/04 |

* cited by examiner

RECYCLED RUBBER BARRIER

FIELD

The disclosure relates to materials made from recycled rubber products including vehicle tires. More particularly, the disclosure relates to material made from crumb rubber chips generated during the rubber recycling process. In still greater particularity, the disclosure relates to molding a crumb rubber skin layer around a central core to produce a structure that can be used as a barrier.

BACKGROUND

Vehicle tires such as automotive, off road (OTR) and truck tires may be recycled and processed into "crumb" rubber or rubber chips. Other rubber products may also be recycled but vehicle tires account for the majority of recycled rubber. During the recycling process, the steel belts and tire cord, sometimes known as "fluff", are removed leaving particles of rubber with a granular consistency known as crumb/ground rubber. The steel and fiber removed during the process may also be recycled. In some recycling operations, tire shreds/chips may also result from the recycling process. These shreds/chips are rubber pieces that contain wire and steel embedded in the rubber. Crumb or ground rubber is different from buffings (rubber fiber/strands) which may be obtained from recycled tires or other rubber products. Buffings are thin slivers (generally less than ¼") which are a byproduct produced when worn-down tire tread is removed from a tire prior to retreading. Granular particles of crumb rubber or buffings are sometimes used in asphalt base, ground cover, artificial turf base, athletic field cover, beneath playground equipment and in other products as a cushioning material. Crumb rubber, as used herein, is intended to refer to both buffings and recycled crumb rubber and rubber chips.

It is estimated that hundreds of millions of waste tires are stored in various privately owned legal and illegal landfills in the United States alone with many more worldwide. Tens of millions of additional waste tires are generated each year. These mountains of tires pose an environmental and fire risk. The uses for recycled tires mentioned above utilize only a small fraction of the waste tire inventory. Some jurisdictions have recently required landfill owners to completely eliminate their tire storage inventory. Additionally, some jurisdictions require that additional used tire shipments received by landfills must be recycled or repurposed and may not be added to the existing storage inventory. Disposal of waste tires is thus a troublesome environmental issue.

A tire shredding process begins with a whole tire which is fed through a primary shredder to produce a shred/chip with the steel and fabric reinforcement still part of the chip. The chips which may be two inches or more are then sent through a rasper/granulator/cracker mill which is a secondary shredder where the 2 inch chips are turned into a ¾ inch or less crumb rubber material from which steel and fabric are removed. Rubber crumb material may then be screened and sized. In some processes ¾", ½", ¼" & 1-3 mm ground crumb rubber portions may be generated.

The recycling process results in crumb rubber granulate of various sizes. The crumb rubber granulate is passed through a screen with a known number of holes per inch. For example, size 10 crumb rubber has been passed through a screen with 10 holes per inch such that, depending upon the gauge of wire used in the screen, the size of the rubber granulate passing through the screen is slightly less than one-tenth of an inch. Similarly, size 20 crumb rubber passes through a screen with 20 holes per inch and has a size slightly less than one-twentieth of an inch. Size 2 crumb rubber is slightly smaller than one-half inch having been passed through a screen with 2 holes per inch.

Crumb rubber may generally be graded or classified on a scale of 1 through 5 according to standard industry practice. No. 1 crumb rubber is granulated tire crumb which is black only (white portions/sidewalls are not included), metal free and with the "fluff" from tire cord removed. No. 2 crumb rubber may include white sidewalls portions. No. 3 crumb rubber may include black crumb only but may be magnetically separated from metal particles. No. 4 may be black and white crumb which has been magnetically separated and No. 5 may be magnetically unseparated and include fluff. Thus, No. 1 crumb is preferred for some applications while No. 5 crumb may be used for applications not requiring a completely clean material.

Traffic barriers or crash barriers including guardrails keep vehicles within a roadway and prevent vehicles from colliding with dangerous obstacles such as boulders, buildings, walls and storm drains. Traffic barriers may also be installed within medians of divided highways to prevent vehicles from entering the opposing lane of traffic and help to reduce head-on collisions. Some of these barriers, designed to be struck from either side, are called median barriers. Other traffic barriers may be installed along the side of a road to prevent errant vehicles from leaving the road and travelling down an embankment such as a hillside or to prevent vehicles from entering a river or lake.

Crash or median barriers can also be used to protect vulnerable areas like school yards, pedestrian zones or fuel tanks from being penetrated by vehicles. An early concrete median barrier design was developed by the New Jersey State Highway Department. This led to the term Jersey barrier being used as a generic term for barriers. However, Jersey Barrier refers to a specific shape of concrete barrier—one which has a wide base with an angled surface and a narrower upper portion. Other types of barriers include constant slope barriers, concrete step barriers and F-shape barriers.

A bollard is a type of barrier that may refer to a variety of structures to control or direct road traffic, such as a series of vertical posts which may be arranged in a line to redirect motor vehicles or to prevent traffic from entering a restricted area while allowing pedestrians, bicycles, and possibly smaller vehicles, to pass between the posts. Bollard posts that are used in traffic applications are generally made from concrete or steel. The bollard posts are typically anchored into the ground or pavement like a fence post. A portion of the post is underground supporting the above-ground portion of the post. Gas stations may use bollard posts adjacent to gas pumps to prevent a vehicle from running into the pumps. Parking lots may also use bollard posts to prevent access to certain areas by a vehicle. Vehicle damage can be caused by bollard posts when, for example, a car door is opened into a bollard post or a vehicle is backed or otherwise impacts a bollard post. Because the bollard post is rigid and usually made from concrete or steel, significant damage may result to portions of an impacting vehicle.

Many other types of barriers such as rock-fall barriers, containment walls, and perimeters may be used for various environmental and containment purposes. For example, rock fall barriers are used along road edges to prevent dislodged rocks from rolling onto the road surface and disrupting traffic. Other types of containment barriers include pedestrian barriers, warehouse barriers, impact barriers, and erosion control barriers such as coastline/seaway barriers. Most of these various size and shape barriers are made from reinforced concrete.

Road barriers are divided into three groups (flexible barriers, semi rigid barriers and rigid barriers), based on the amount of their deflection when struck by a vehicle and the mechanism the barrier uses to resist the impact forces. In the United States, traffic barriers are tested and classified by the various federal and state highway and transportation departments according to deflection standards.

Flexible barriers include cable barriers and weak post corrugated guide rail systems. These are referred to as flexible barriers because they will deflect when struck by a typical passenger car or light truck. Impact energy is dissipated through tension in the rail elements, deformation of the rail elements, posts, soil and vehicle bodywork, and friction between the rail and vehicle. Semi-rigid barriers include guide rails that bend more than rigid barriers, but less than flexible barriers.

Rigid barriers are usually constructed of reinforced concrete. A permanent concrete barrier will only deflect a negligible amount when struck by a vehicle. Instead, the shape of a concrete barrier is designed to redirect a vehicle into a path parallel to the barrier. Jersey barriers and F-shape barriers also lift the vehicle as the tires ride up on the angled lower section to dissipate impact energy.

When a vehicle impacts a jersey type barrier in shallow-angle hits, the shape is intended to minimize sheet metal damage on the vehicle by allowing the vehicle tires to ride up on the lower sloped face. Impact energy is dissipated through redirection and deformation of the vehicle itself. Impact forces are opposed by a combination of the rigidity and mass of the barrier. For rigid barriers, deflection of the barrier is usually negligible. For low-speed or low-angle impacts on these rigid barriers, that may be sufficient to redirect the vehicle without significantly damaging the bodywork.

The need to have a single-slope barrier profile that has more consistent performance than a vertical-face concrete wall led to the development of constant-slope barriers. A constant slope barrier is a traffic barrier which is usually made of reinforced concrete and designed with a single slope that is used to separate lanes of vehicular traffic. Constant-slope barriers have varying heights and have a constant slope face that makes an angle with respect to the vertical. One advantage to constant slope barriers as compared to more complex shapes such as the Jersey and F barriers is that its performance is not as affected by changes in the height of the roadbed during repaving. Both constant-slope barriers and vertical walls can facilitate resurfacing because their performance is insensitive to the thickness of the asphalt overlay. This is particularly advantageous when constructing barriers on curved ramps and for resurfacing operations that otherwise would require resetting shaped barriers. California and Texas have developed constant slope barriers with varying angles. The Texas Constant-Slope Barrier has performed similarly in crash tests to the Jersey barrier while the California design has compared similarly to the F-Shape barrier in crash tests.

SUMMARY

A barrier structure includes a core infrastructure and an outer skin portion surrounding the core. The core infrastructure may include a containment body. The containment body may include a frame structure that contains recycled or other waste or inexpensive filler material. The containment body may also include a geotextile or other containment structure that can hold various types of filler material. In some embodiments, the containment body may be a bundle of recycled tires or other waste material.

The outer skin portion of the barrier structure may include recycled rubber products molded together with a binder. In one embodiment, the binder may be non-flammable or the skin portion may be coated with non-flammable coating to render the barrier structure flame resistant. The outer skin portion may also include other materials such as virgin or other rubber as well as plastic material. The outer skin is molded around the core infrastructure so as to provide a resilient barrier surface. The barriers include various shapes such as rectangular, cubic, Jersey and F shaped, as well as hollow bollard covers. The molded outer skin portion of the barrier may also be repaired on-site by mixing rubber portions with a binder and applying the mixture to the skin portion.

The barriers may also include a void space remaining after molding with or without a mold section remaining therein. These hollow barriers are lighter and can be transported and placed more easily. The void space may be filled with liquid, sand or other material on-site.

The barriers may be attached to one another by various interconnection and attachment systems. In one embodiment, various types of protrusions and matching recesses may be molded into or onto the surface of the barriers and thus adjacent barriers may fit one into the other. In another embodiment, loops or other attachment devices may be molded into the barrier or attached to the core infrastructure thus protruding through the skin portion of the barrier. Mechanical fasteners such as pins may then join the loops of adjacent barriers. In some embodiments, the barriers may be stacked to form a containment structure.

The barriers are manufactured using rubber crumb portions which are mixed with a binder and, in some embodiments, with added water to aid in coating the rubber portions with binder and decreasing the cure time of the binder. A core infrastructure may be filled with filler material and the coated portions are molded around the core infrastructure. The core infrastructure may also be left empty and the void space created may later be filled with ballast or other fillers. The molded barrier is allowed to cure and may be subjected to heating while in the mold to reduce binder cure time in the skin portion of the barrier.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
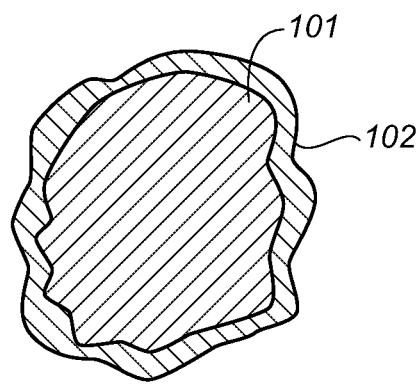
FIG. 1 shows a sectional view of a rubber crumb portion coated with a binder.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims. Like reference numerals denote like structure throughout each of the various embodiments.

Referring to FIG. 1, a rubber chip 101, which may be recycled rubber crumb (styrene butadiene rubber) from tires such as automotive, off road, or truck tires in one embodiment, is shown. Rubber crumb 101 may be generated from a tire shredding process and may be partially or completely coated with a binder 102. Rubber crumb 101 generally has an irregular granular shape, having been processed from recycled tires through a rasper/granulator and/or cracker mill as described herein.

Figure 2:
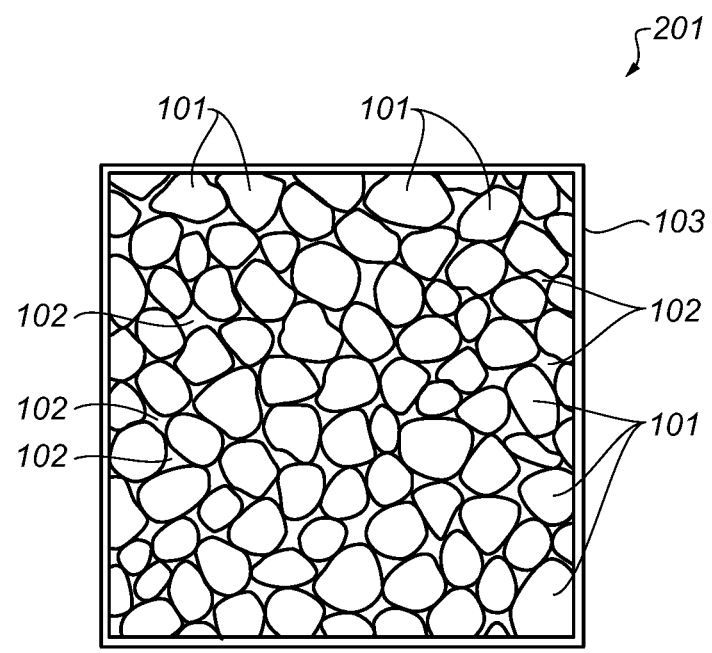
FIG. 2 shows a side view of a material made from crumb portions bound together.

Referring to FIG. 2, a side view of a material 201 is shown that includes rubber crumb portions 101 which are held together by binder coating 102 on the outside of crumb 101 such that crumb portions 101 bond to one another and form solid material 201. In one embodiment, binder 102 may be Stobicoll® R 359 manufactured by Stockmeier Urethanes USA. However, binder 102 may be any polyurethane resin binder or other suitable binder including water based, latex based, acrylic based, Castor Oil or Polymers. Isocyanate binders such as methylene diphenyl diisocyanate (MDI) or toluene diisocyanate (TDI) may also be used. Curing agents or accelerants can be added to binders/bonding agents to accelerate cure time. Binder 102 may be non-flammable so as to increase the flame resistance of material 201. In some embodiments, material 201 may be coated with a flame resistant coating 103.

Material 201 may be a resilient material and may have a density range of about forty to about sixty pounds per cubic foot (40-60 lb/ft$^3$). The specific gravity of material 201 is greater than 1 with a preferred specific gravity of between about 1 and 1.4. Thus, material 201 is not buoyant in water. Material 201 may be easily molded into a variety of shapes and sizes thus facilitating its use in a variety of applications as will be further disclosed herein. In one embodiment, material 201 may have a load capacity sufficient to allow vehicular or heavy machinery traffic to impact material 201 without significant deleterious effect to either material 201 or the impacting vehicle.

Some barriers such as road barriers may have smooth finishes to allow the impacting vehicle to slide on the surface as opposed to climbing the surface. For example, in road barriers with coarse finishes, the drive wheel of front wheel drive vehicles may climb the barrier at some impact angles potentially causing the vehicle to roll over. Containment walls usually require smooth vertical faces on these types of barriers to prevent vehicles from climbing the barrier. In one embodiment, material 201 may be made to include a smooth skin texture. The texture of the surface of material 201 may be changed by changing the particle size of the crumb rubber 101. The finer the crumb rubber the smoother the resulting surface will be and the larger the crumb rubber pieces used in material 201, the rougher the surface texture will be.

Concrete road or other rigid barriers have unforgiving surfaces resulting in significant damage to an impacting vehicle or machinery. In some situations, a portion of the concrete barrier may break off and be propelled into another vehicle or into oncoming traffic. In other situations, initial placement of a concrete barrier may cause portions of the barrier to chip or break off and/or may damage surrounding infrastructure such as road surfaces. In one embodiment, material 201 is more resilient than concrete or steel, such that, if a vehicle hits a barrier made of material 201, then there will likely be less adverse impacts if a portion of rubber material 201 breaks free as opposed to chunks of concrete aggregate. Similarly, if a barrier made from material 201 is dropped or mishandled during transport or placement, damage to the barrier or the surrounding infrastructure is mitigated by the resilient nature of material 201.

If material 201 is damaged, the portions of rubber material 201 that are displaced can be repaired on-site by a typical pour-in-place method. The end user can blend rubber and binder together and apply the blended material to the damaged area by troweling, spraying or other means. The repair material may then be allowed to cure in ambient air and the resulting repaired surface may be indistinguishable from the original surface. In this manner, the barrier can be repaired much more easily than a concrete barrier or barrier made of other material.

Because material 201 includes resilient rubber material, a vehicle impact or an impact from another surface on barriers made of material 201 will cause the material 201 to deform and thus at least partially absorb and disperse the energy of the impact. Barriers made from material 201 as compared to concrete barriers will thus have better impact ratings and be safer and cause less damage to an impacting vehicle than barriers made from concrete or other rigid materials.

Figure 3:
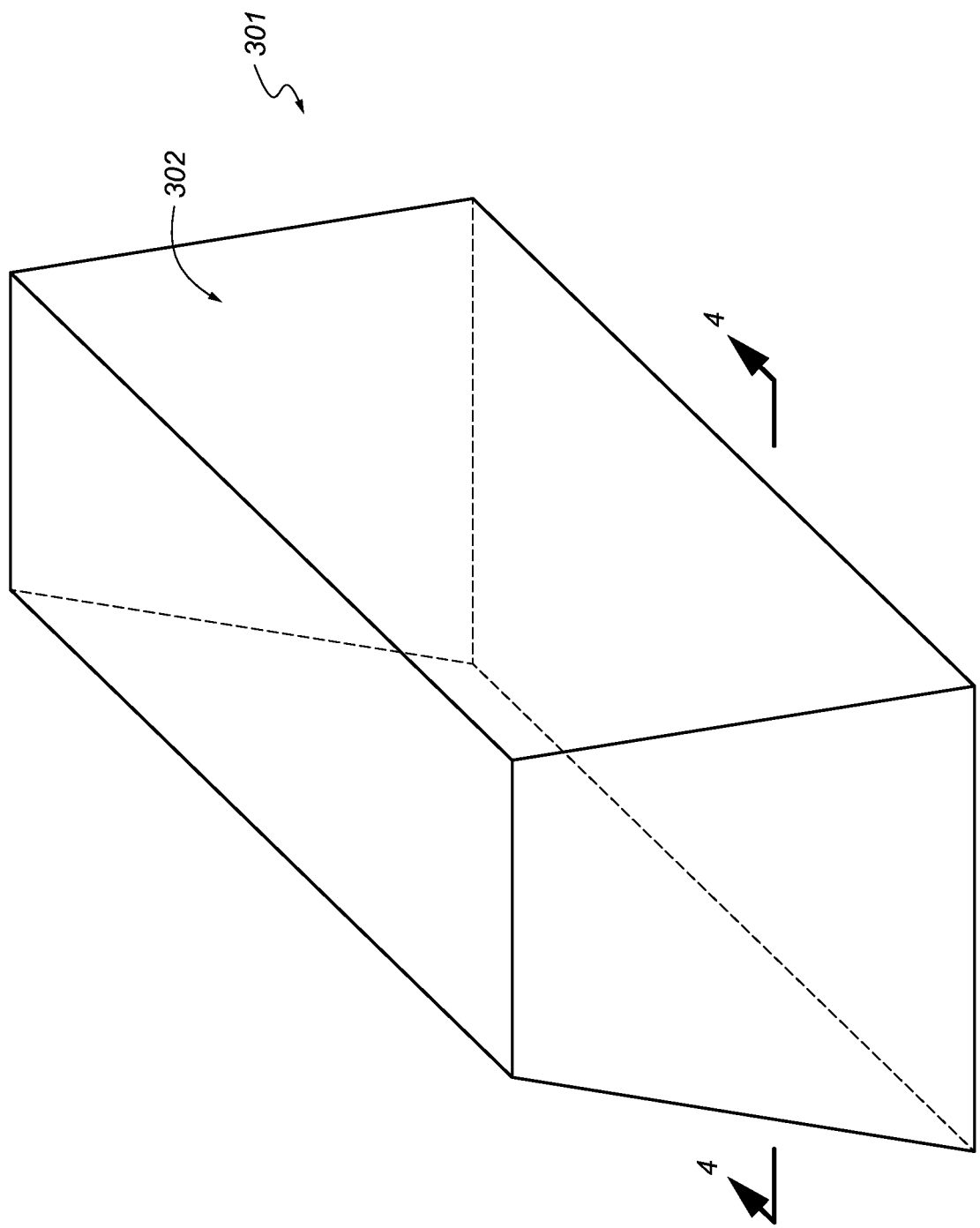
FIG. 3 shows a perspective view of a constant slope barrier.

Referring to FIG. 3, in one embodiment, a barrier 301 may be made in the shape of a standard constant slope barrier. While a constant slope barrier embodiment is shown, it should be understood that various barrier size and shapes in various embodiments. For example, barriers of various height, length, weight, connection system, geometric shape (cubes, rectangles, trapezoids, pyramidal etc.), impact resistance, and/or color can be made. As stated above, the size of rubber crumb used in making barrier 301 determines at least in part the smoothness of the resulting surface 302 of the barrier 301.

Figure 4:
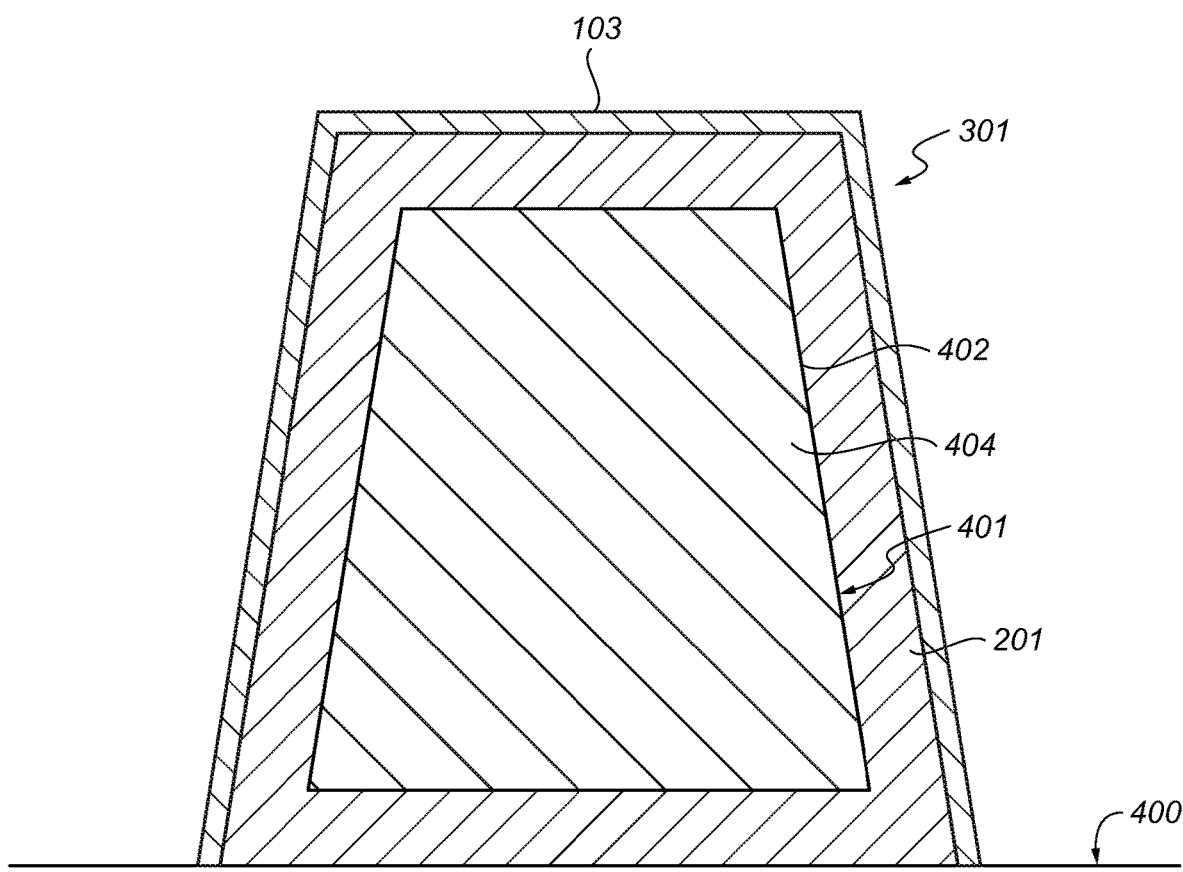
FIG. 4 is a side sectional view through line 4-4 of FIG. 3.

Referring to FIG. 4, a cross-sectional view taken along line 4-4 of FIG. 3 is shown. Barrier 301 is placed on a surface such as concrete pavement 400. A core infrastructure 401 which may include a containment body 402 is completely enclosed by a molded skin material 201 made from recycled rubber and a binder. The containment body 402 may be made from steel but many other materials may be used as core infrastructure including plastics, composites, concrete, bags, pressed shapes of recycled materials, baled tires, etc. In one embodiment, barrier 301 includes a core infrastructure 401 that provides rigidity and strength, while also allowing various filler materials 404 to be used for weight, strength, ballast, energy dispersion, and various other reasons. In one embodiment, core infrastructure 401 includes a containment body 402 which may include a metal frame or other rigid frame. A flexible material such as a geotextile material may be used to contain the filler material 404 in some embodiments.

In one embodiment, the containment body 402 is filled with recycled tire filler material 404 such as tire shreds/chips or some otherwise unusable material. The density of uncompressed rubber material 404 is about twenty to thirty five pounds per cubic foot (20-35 PCF). In some embodiments, #5 crumb rubber may be used as filler material 404 but the cost of crumb rubber may make such use economically infeasible. In other embodiments, other waste materials or otherwise unusable rubber fluff including metal portions may be used as filler material 404. In other embodiments, materials such as expanding foam, air, water, rocks, plastic, refuse, baled tires and many other materials could be used as filler material 404 to fill containment body 402.

Referring again to FIG. 4, molded skin portion 403 can be any thickness. In one embodiment, a skin portion 403 thickness of about 2 inches is used around core infrastructure 401. The 2" thickness may vary and skin portion be less than 2" or greater than 2". A reduction in cost is achieved by molding skin layer 403 around a core infrastructure 401 rather than a barrier made completely from molded crumb rubber and binder such that barrier 301 may be made cost competitive with concrete. The cost to mold the same size barrier 301 with all crumb rubber and without core infrastructure 401 would be 2-3 times greater. The thickness of skin portion 403 may be varied depending upon the preference of the end user and the specific use or application and the desired impact resistance of the barrier 301.

In addition to reducing cost and providing a core infrastructure for barrier 301, containment body 402 aids in preventing warping or twisting of barrier 301. That is, material 201 may be subject to such warping or twisting if not stabilized by containment body 402. In addition, rigid core allows skin material 201 to be molded around rigid core 402 by allowing material 201 to be compressed against containment body 402. In the absence of containment body 402 a mold press could only compact material 201 against itself and the thickness of the barrier would be limited. For example, in an embodiment where the barrier includes a three foot wide dimension, without containment body 402, the material 201 would have to be three feet thick rather than about two inches thick as discussed above. Molding and curing such a thick material greatly increases the difficulty and cost of molding barrier 301.

Without containment body 402, the amount of compression needed to achieve 40-60 PCF in the interior of a three foot thick layer of skin material 201 in as discussed above would be difficult to achieve. As discussed herein, the use of a core infrastructure with the molded skin material 201 molded around it allows more uniform pressure to be applied throughout the interior of material 201 than would otherwise be feasible if skin portion 201 included a thickness of 2, 3, or even 6 foot dimensions as required for certain types of barriers. By using containment body 402 as part of the structure 301 and as a back molding surface, the thickness of skin portion 201 may be kept to about two (2) inches which permits easier molding of the skin portion. That is, molding a thinner (i.e. 2 inch) layer is significantly easier and more cost effective than molding a thicker (i.e. 1, 2, or 3 foot) layer of material 201.

Figure 5:
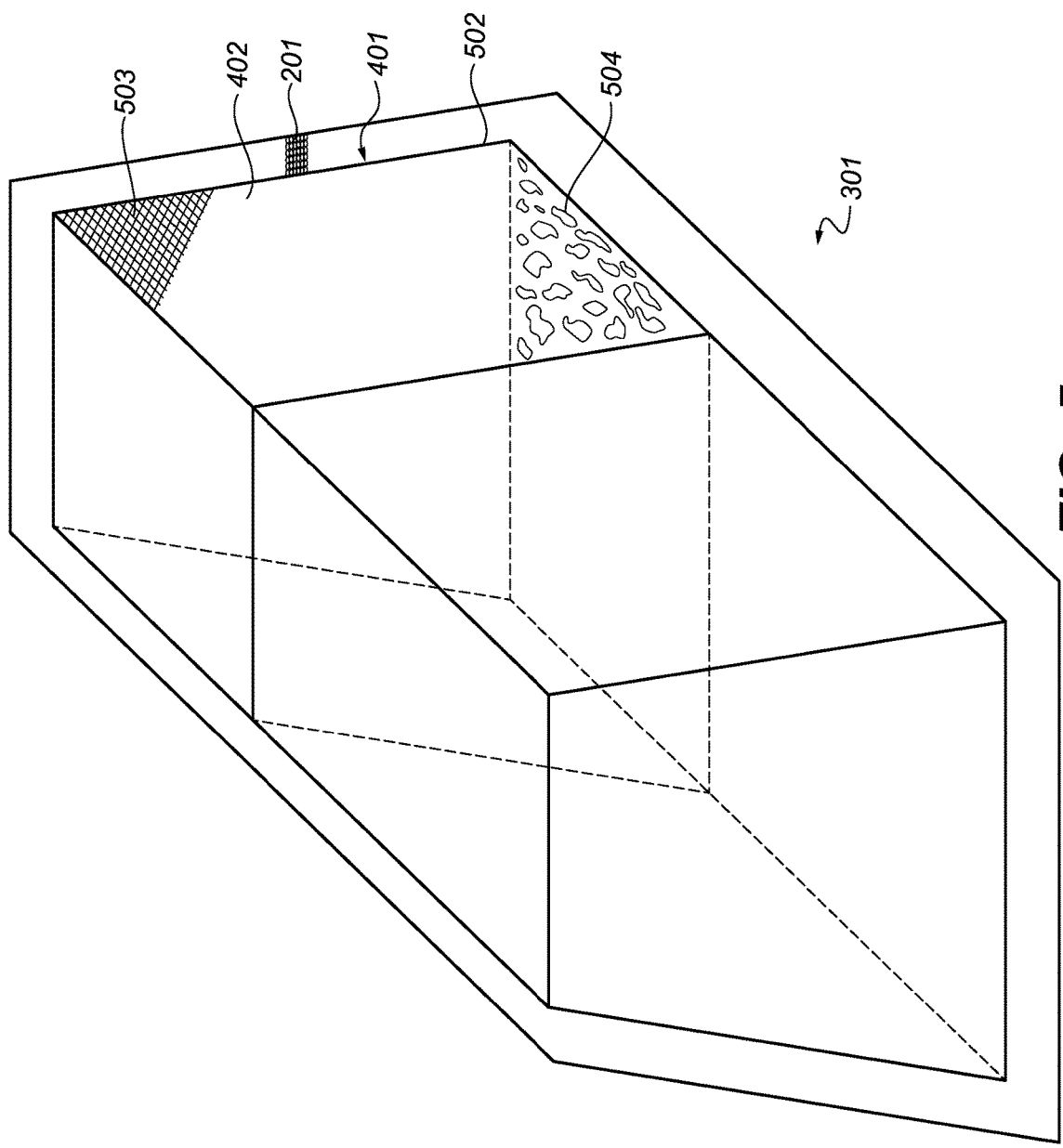
FIG. 5 is a partial cutaway view of a barrier with a core infrastructure.

Referring to FIG. 5, in one embodiment, a partial breakaway view of barrier 301 shows core infrastructure 401 including containment body 402 that includes steel frame 502 with a wire mesh or other material 503 attached to the frame. Waste or otherwise unusable material such as tire shreds or chips or concrete waste or rocks may be used as filler material 504. In other embodiments, a rebar frame 502 may be assembled with wire and covered by a re-mesh or wire mesh screen/netting 503 to contain filler material 504. In another embodiment, geotextile containers such as tubes, bags, and socks may be used as containment body 402 and filled with recycled rubber or recycled materials such as tire chips/tire shreds which may or may not be molded or bonded together. In some embodiments, whole tires may be compressed and stapled, nailed, or wired and then baled together to be used as the core infrastructure 401. Recycled concrete pieces may also be used to fill the containment body 402. Barrier 301 may thus utilize various types of recycled or otherwise unusable material in containment body 402. Because the cost of these materials, as well as that of recycled rubber used in skinmaterial 201, is extremely low, the cost of barrier 301 may be kept cost competitive with, or lower than, a traditional concrete or other barrier.

Figure 6:
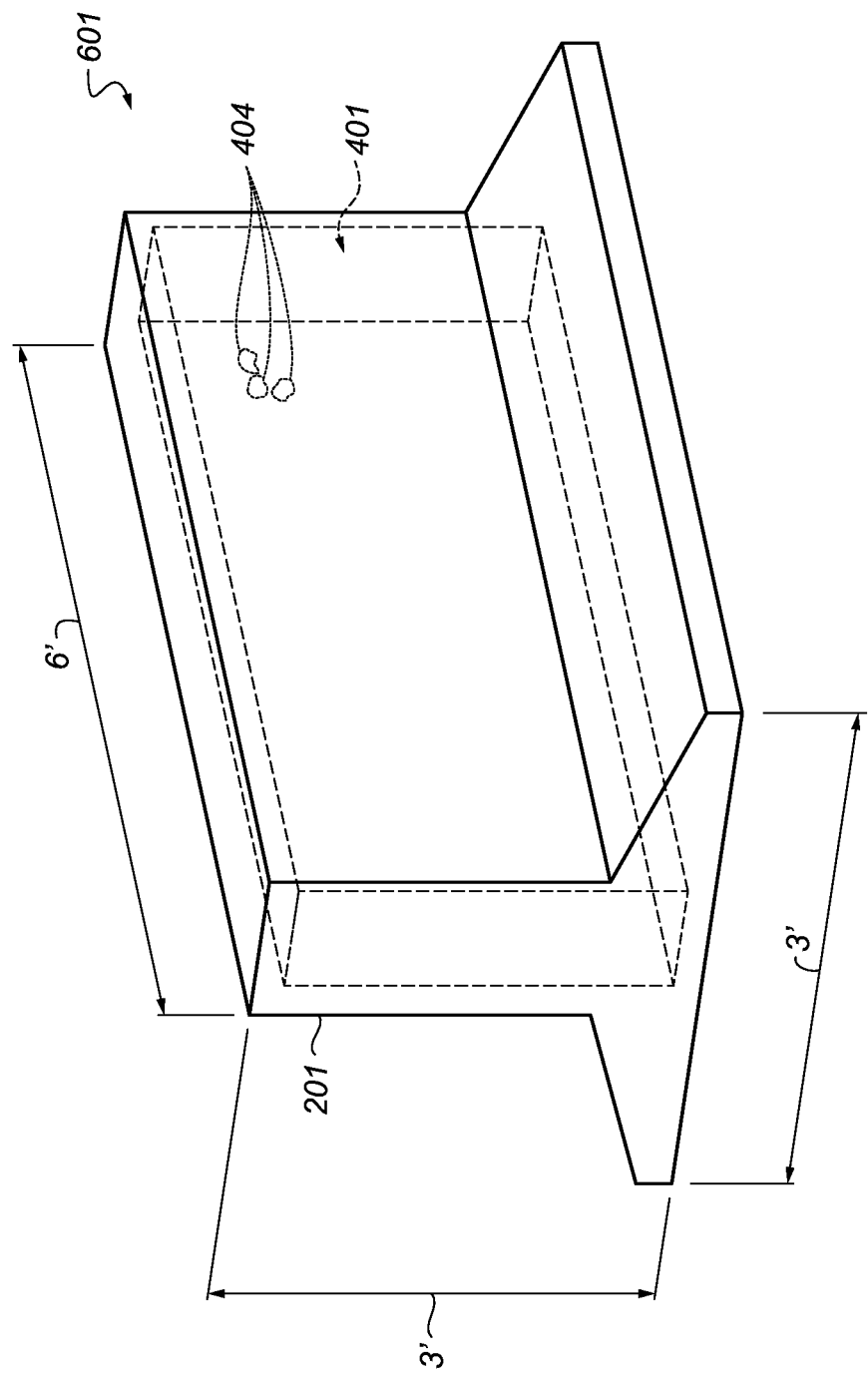
FIG. 6 is a perspective view of a Jersey type barrier with core infrastructure.

Referring to FIG. 6, in one embodiment, a Jersey type barrier such as barrier 601 in a standard 6 foot by 3 foot by 3 foot configuration weighs about 2100 pounds if recycled rubber is used as filler material 404 in core infrastructure 401. The weight of barrier 601 approximates the weight of a similar sized Jersey barrier made from concrete. Because the type of filler material 404 in core infrastructure 401 is only used as ballast for weight and fill, it is immaterial which material 404 is used to fill core infrastructure 401. The weight of barrier 601 may be controlled by using lighter or heavier, or greater or less compression of, filler material 404 to fill core infrastructure 401 such that the barrier 601 may be more easily transported, handled and placed than traditional barriers made from concrete.

Figure 7:
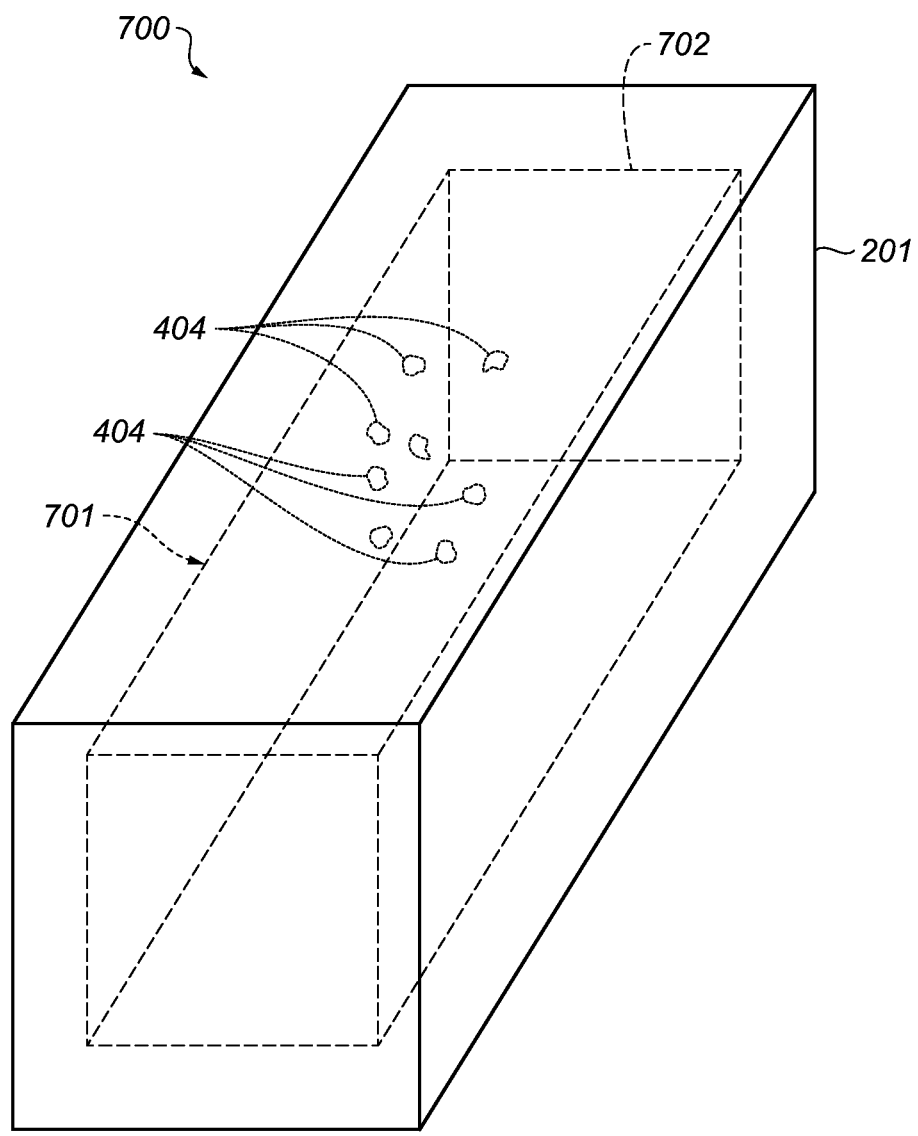
FIG. 7 is a perspective view of a rectangular barrier with core infrastructure.

Referring to FIG. 7, other shapes may be used for various types of barriers such that barriers may be easily stacked on top of one another. In one embodiment, a rectangular barrier 700 may include a core infrastructure 701 containing filler material 404. Barrier 700 may be used in place of, or in addition to, other types of barriers as vehicle barriers or rock fall barriers or for erosion or flood control. Core infrastructure 701 may include a frame 702 to contain material 404 or frame 702 could be replaced with a geotextile or other type of core infrastructure 701. A layer of material 201 may be molded around core infrastructure 701 and may contain recycled rubber and binder as described herein. Filler material 404 may be any suitable filler material such as tire shreds or other recycled material as discussed herein.

Figure 8:
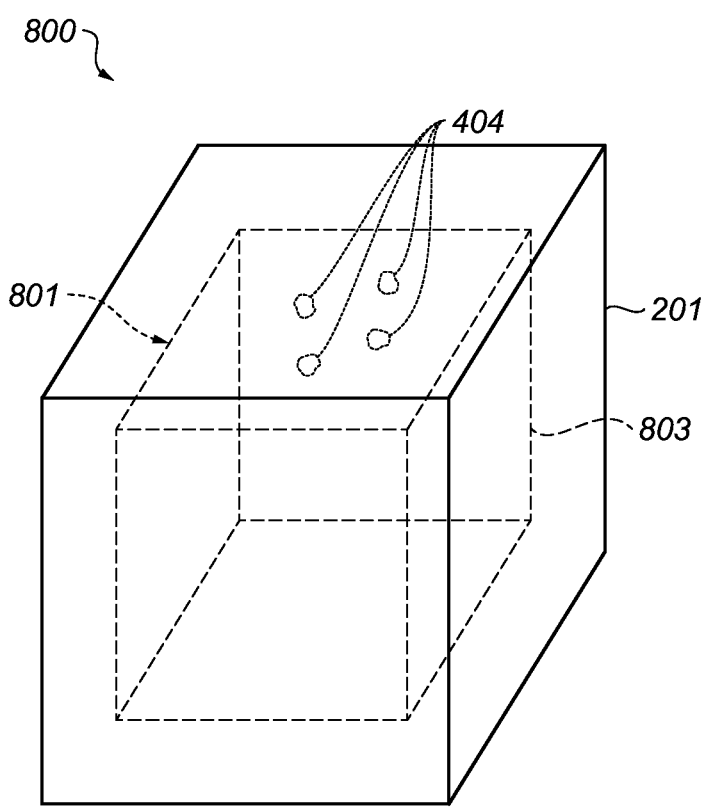
FIG. 8 is a perspective view of a cube barrier with core infrastructure.

In another embodiment, referring to FIG. 8, a cube 800 may be used as a barrier. For example, cube 800 could be used as a rock fall barrier. Barrier 800 may include core infrastructure 801 containing filler material such as material 404. Core infrastructure 801 may include a frame 803 or could be a geotextile or other type of core infrastructure. A layer of material 201 which, in one embodiment, includes recycled crumb rubber and binder is formed around core infrastructure 801. Filler material 404 may be any suitable filler material such as tire shreds or other recycled material as discussed herein.

Figure 9:
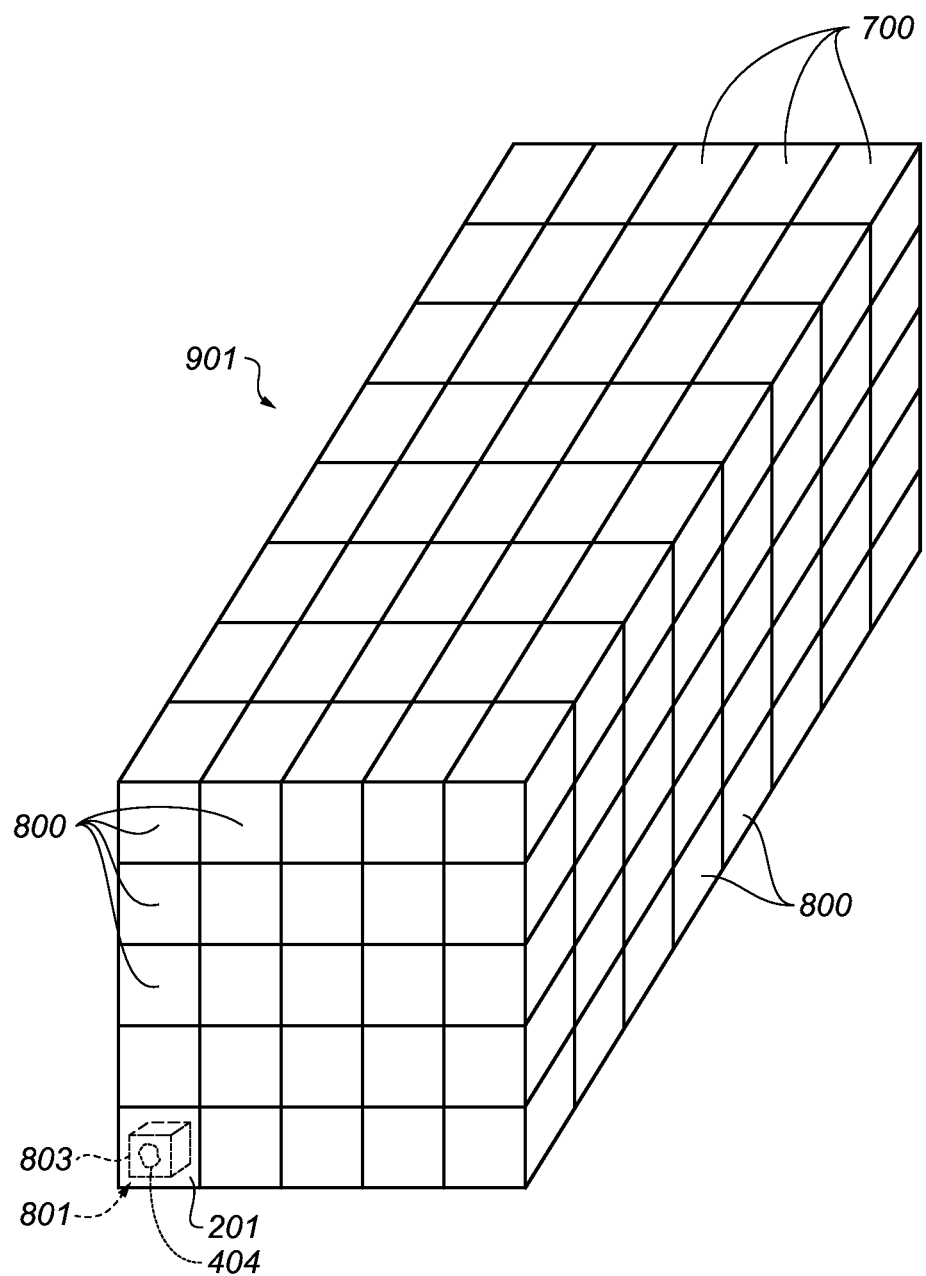
FIG. 9 is a perspective view of a containment structure made from multiple stacked barriers.

Referring to FIG. 9, in some embodiments, multiple cube barriers 800 or rectangular barriers 700 or other barrier shapes could be stacked adjacent to one another as shown or offset in a brick-like pattern. Each of cube barriers 800 include core infrastructure 801 and frame 803 containing filler material 404 and surrounded by skin material 201. Barriers 700/800 form a structure 901 that can be used as a rock fall, sea wall, erosion control, or water barrier or other type of containment or retaining wall.

Figure 10:
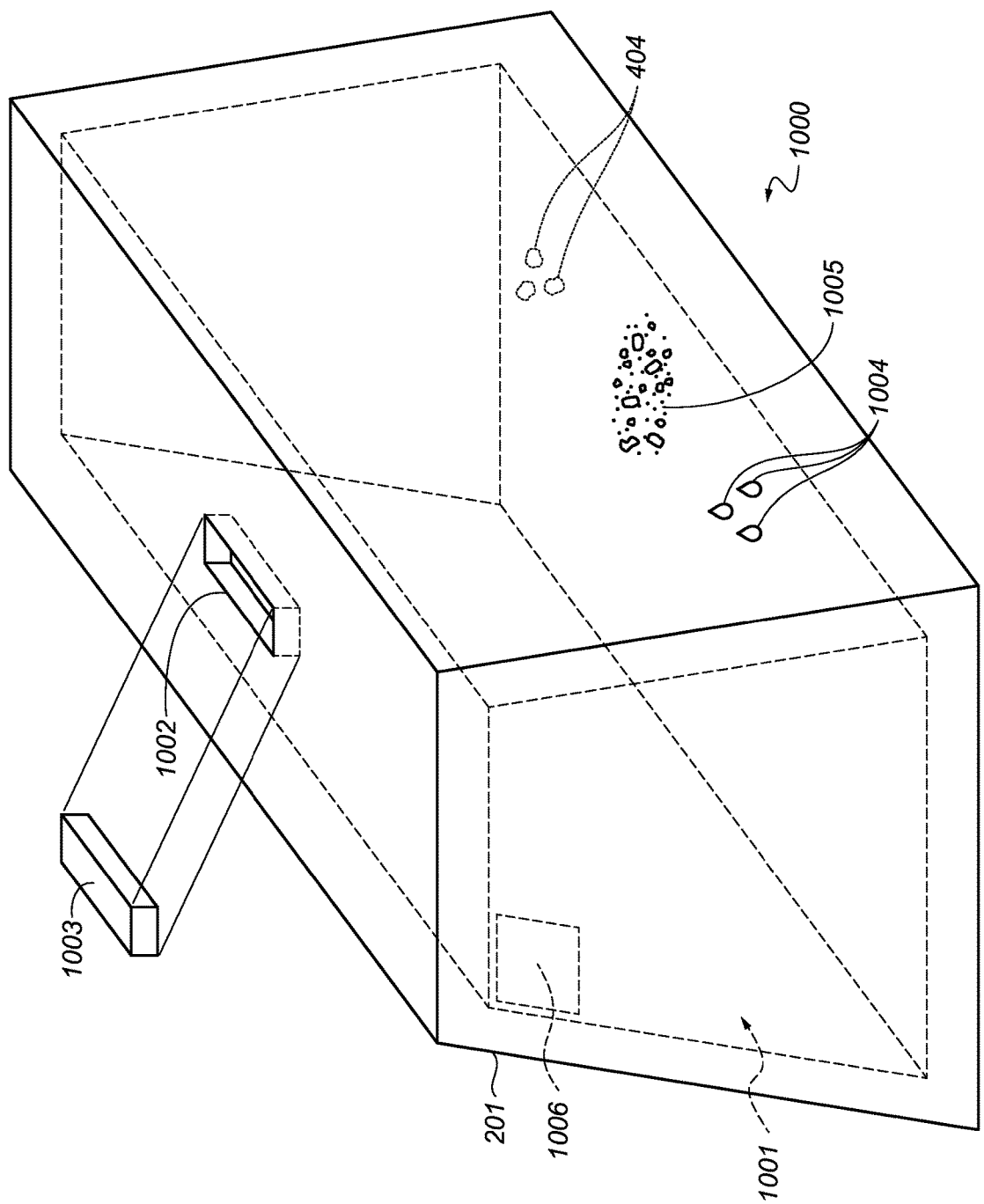
FIG. 10 is a perspective view of a barrier with a void as the core infrastructure.

Referring to FIG. 10, in an alternate embodiment, a barrier 1000 can include a hollow core 1001 that can be produced by utilizing a removable piece of a mold 1006 to create a void space 1001 inside the barrier 1000. The hollow core 1001 will create vanes, reservoirs, and cavities throughout the interior of the barrier/block 1000. These can then be filled with a specified material/substance such as a filler material 404. In one embodiment, the hollow portion 1001 could then be filled with water 1004 or sand 1005 before or after placement of barrier 1000 to allow barrier 1000 to be used for flood control in place of sandbags. An unfilled barrier 1000 is lighter to allow easier transport and placement of the barrier prior to being filled with water, sand or other filler material 404. Void space 1001 acts as core infrastructure when filled with water, sand, or other filler material 404. Rather than being removed, the mold piece 1006 may remain inside the barrier in some embodiments thus becoming a permanent part of the barrier 1000. An access hole 1002 in barrier 1000 could be used to fill void space 1001 with water 1004, sand 1005 or other filler material 404 on-site and a plug 1003 could be placed into access hole 1002 after void space 1001 is filled. An onsite pour-in-place method as described above could then be used to seal plug 1003 in access hole 1002.

Portable concrete barriers (PCBs) have greatly improved safety in construction work zones. PCBs are made of precast concrete safety shape sections joined together to form a continuous longitudinal barrier. Because portable concrete barriers are primarily intended to keep errant vehicles from hitting construction workers, the dynamic lateral deflection of these barriers must be kept to a minimum. The connection of concrete barriers has traditionally been accomplished by including metal hooks on the ends of the barriers which may then be fastened one to the other. Various types of connecting devices and methods can be used for connecting the blocks or interlocking the barriers.

Figure 11:
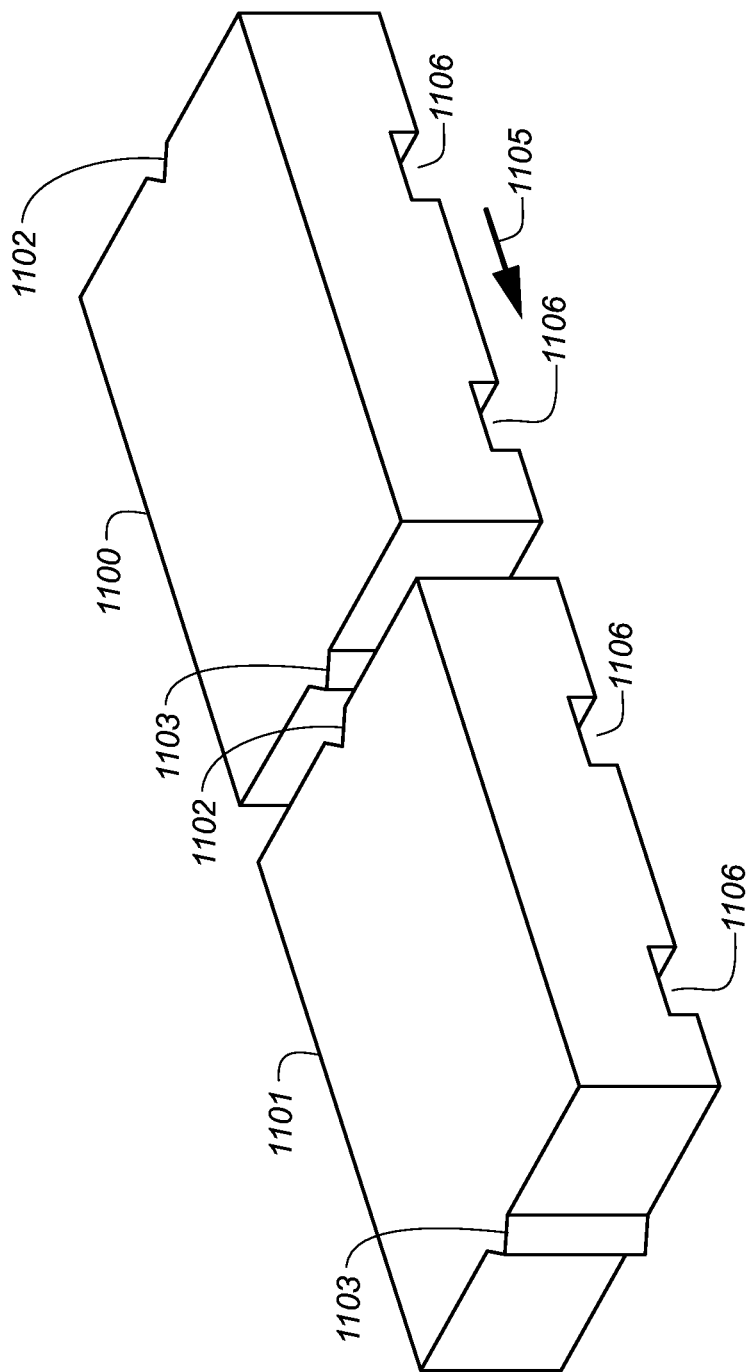
FIG. 11 is a perspective view of one barrier interconnection mechanism.

Referring to FIG. 11, in some embodiments, a V channel system can be used to interlock barriers 1100 and 1101. This connection system can be used to connect barriers together horizontally or vertically. For horizontal applications, a three dimensional V pattern notch 1102 can be molded into one end of the barrier while a V pattern protrusion 1103 can be molded into the opposite end of the barrier to fit into the notch 1102 when barrier 1000 is moved in direction indicated by arrow 1105. While the V pattern notch and protrusion are shown extending only partially across the width and the remainder of the edge is flat, in some embodiments the V pattern extends across the entire width of the barriers. Instead of V channel system, other shapes can be molded into the barriers such as pegs, cones, triangles or any kind of three dimensional protrusion shape molded to the top or side of a barrier while having the same shape notch molded into the bottom or opposite side of the barrier. The notch shape at the bottom or side of the barrier allows the peg, cone or other protrusion on top or side of the adjacent barrier to fit inside the void on an adjacent barrier. Notches 1106 can also be molded into the base of the barrier to allow a forklift or material handler to move the barriers 1100 and 1101 and place them as desired.

Figure 12:
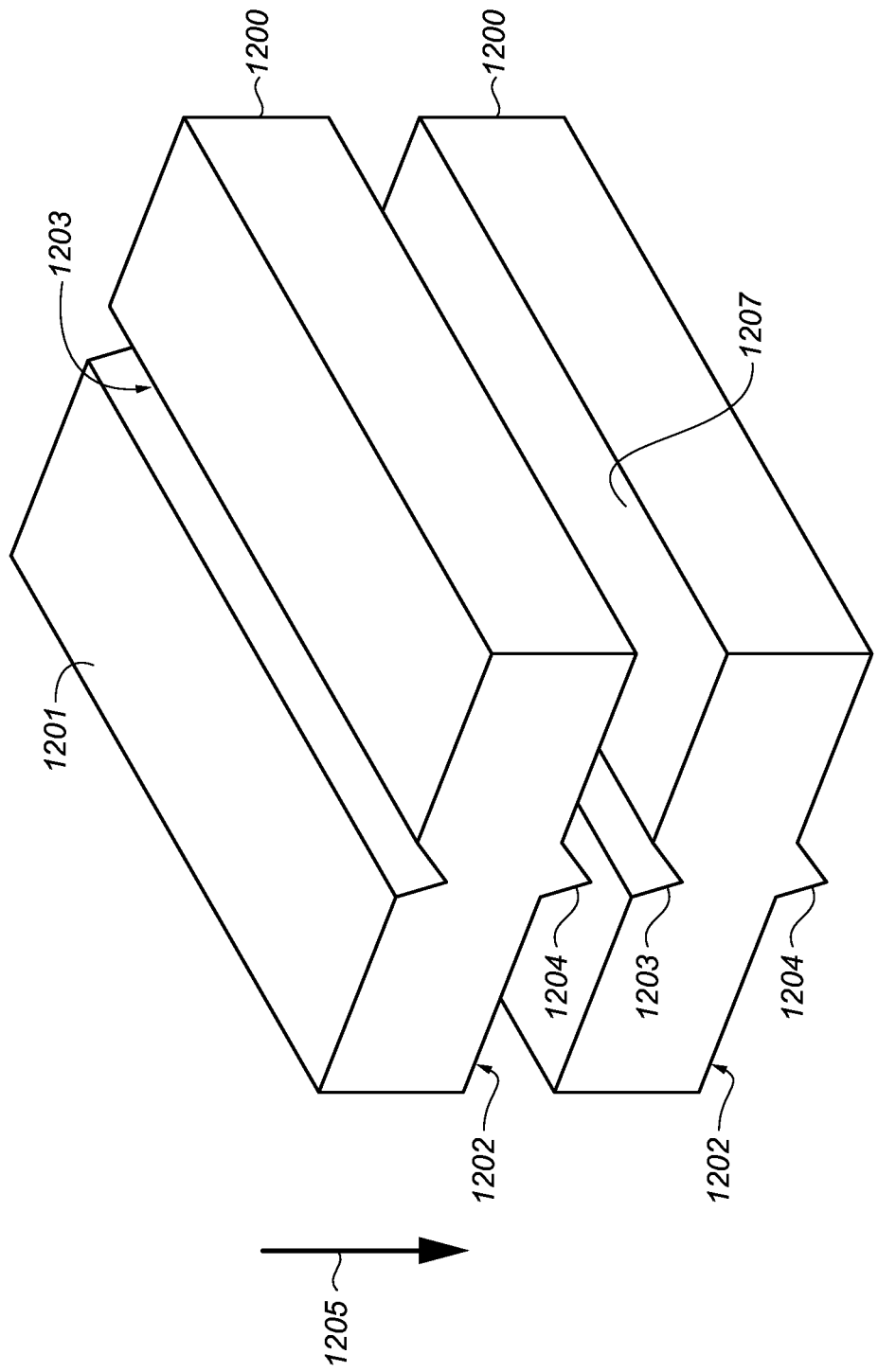
FIG. 12 is a perspective view of an alternate barrier interconnection mechanism.

Referring to FIG. 12, for vertical stacking arrangements such as shown in FIG. 9 or in other stacking applications, a three dimensional V pattern can molded into the top 1201 and bottom 1202 of the barrier 1200. While the V pattern notch and protrusion are shown extending only partially across the top and bottom with the remainder of the edge being flat, in some embodiments, the V pattern extends across the entire top and bottom of the barriers. Barriers 1200 may be stacked onto each other barrier for vertical applications. Notch portion 1204 fits into V portion 1203 to allow the barriers 1200 to be stacked in the direction indicated by arrow 1205. In some embodiments a V pattern can be molded into both the ends and on the top and bottom combining the embodiments shown in FIGS. 11 and 12 for horizontal and vertical applications.

Figure 13:
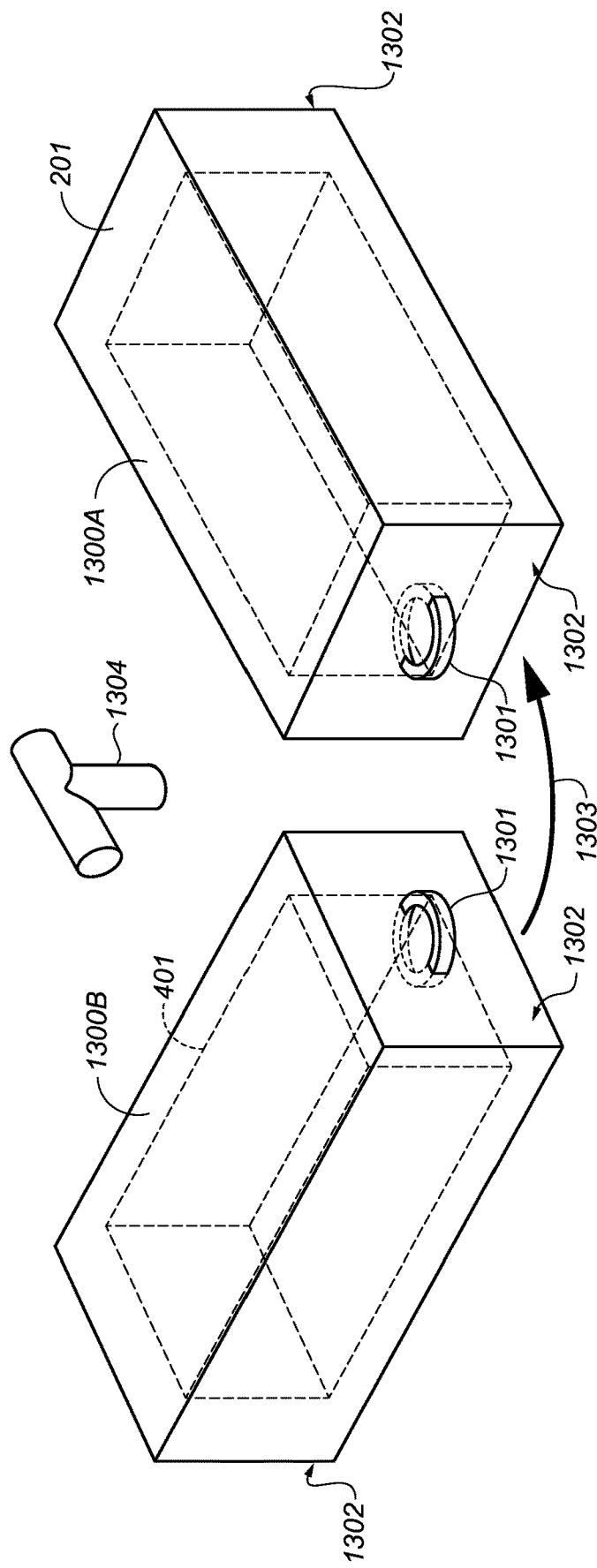
FIG. 13 is a perspective view of an alternate barrier attachment mechanism.

Referring to FIG. 13, in some embodiments, a pin and loop system may be used to join adjacent barriers. A hook or loop 1301 can be molded into the ends 1302 of the barriers 1300A and 1300B. In some embodiments, the hook or loops 1301 are made out of metal or rebar and molded into material 201. However, the hook or loop can be made out of other rigid materials. The hooks or loops are located on the ends 1302 of the barriers such that, when two barriers 1300A and 1300B are placed adjacent to one another in the direction of arrow 1303, the loops 1301 slide over or underneath each other and may or may not touch each other. Once the loops 1303 are lined up a pin 1304 can be placed through the center of both of the overlapping adjacent loops 1301. The pin 1304 locks the barriers 1300A and 1300B together and in place. In some embodiments, the core infrastructure 401 can also be used as an anchoring point for loops 1301. The core infrastructure 401 can include connection hooks 1301 or other connection devices can be attached to or built into the design of the core infrastructure 401 allowing for different types and locations of connection points for particular applications.

Concrete or steel bollards may be effective at controlling vehicle traffic by preventing a vehicle from passing through but allowing pedestrians or smaller vehicles such as carts or bicycles to pass between the posts. However, the concrete or steel bollards may damage vehicles because of the unforgiving surface nature of the concrete or steel surface. By installing a bollard post cover or sleeve over an existing post, damage to a vehicle due to impact of the vehicle can be minimized or eliminated. Many existing bollard post covers are hollow sleeves made from plastic. However, plastic may also be rigid and may be prone to breakage and cracking due to impact and to exposure to environmental elements such as sun rays and freeze/thaw events.

Figure 14:
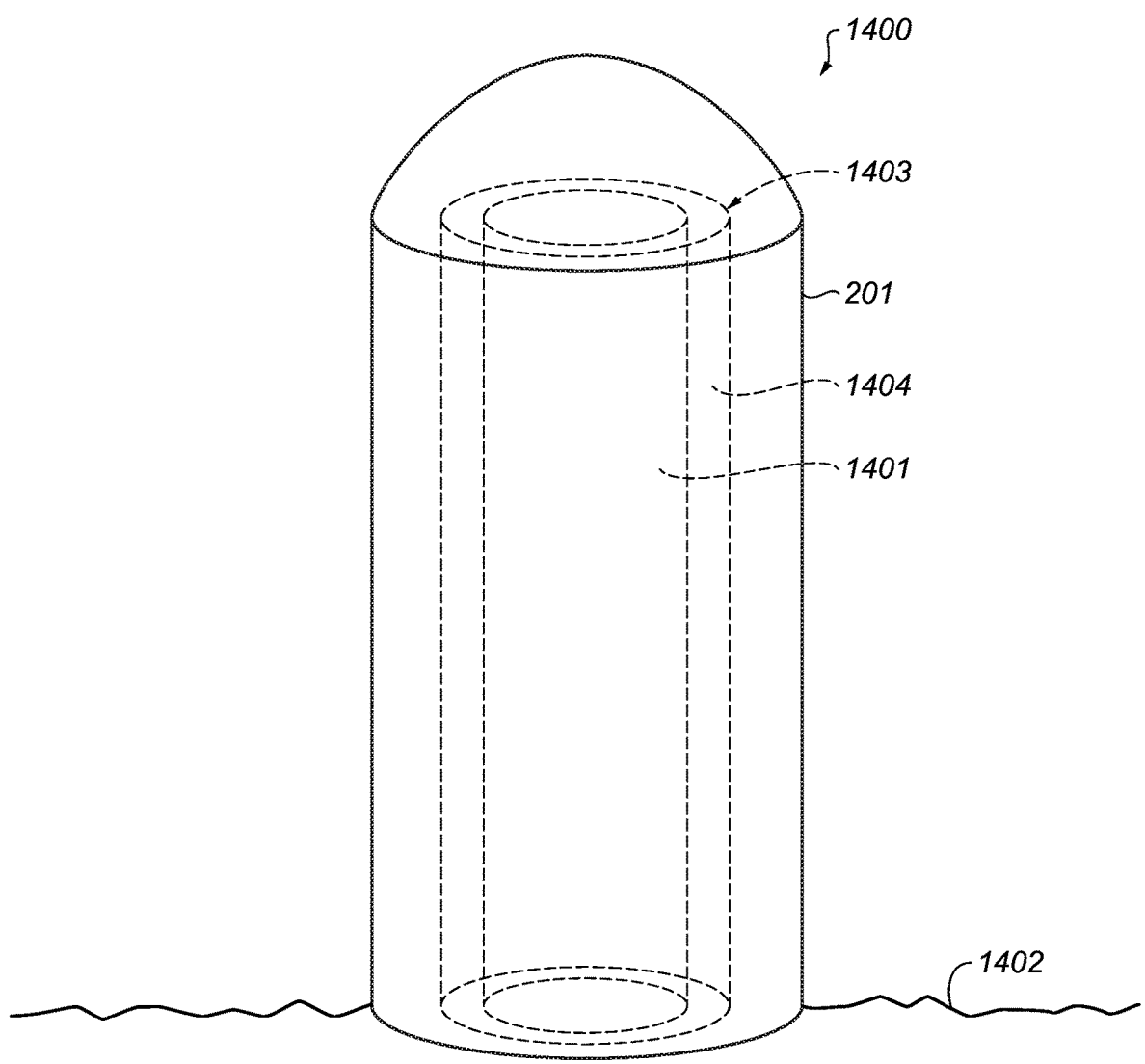
FIG. 14 is a perspective view of a bollard barrier cover.

Referring to FIG. 14, in one embodiment, a bollard post cover includes a sleeve 1400 made from recycled rubber material 201 is placed over a bollard post 1401. Post 1401 may extend into and beneath the pavement or other surface 1402 and may be anchored by concrete or other means. Post 1401 may be made of steel or concrete or other suitable material. Bollard sleeve 1400 includes a hollow portion 1403 that fits over post 1401. Hollow portion 1403 may be sized such that the space 1404 between skin material 201 and post 1401 is minimized to allow a tight fit of sleeve 1400 over post 1401. In some embodiments, sleeve 1400 may also be attached to post 1401. By using recycled rubber, the bollard post cover 1400 is still rigid enough to hold up to weather conditions and vehicle impacts but resilient enough so as to minimize damage to vehicles during those impacts. The risk of damage to a vehicle is significantly reduced by using a rubber bollard post cover or sleeve. The bollard post covers/sleeves made from recycled rubber can also be colored, or a reflective tape can be added to sleeve 1400 to increase visibility to a vehicle operator or a pedestrian. The use of colored rubber crumb portions 101 in material 201 permits bollard sleeve 1400 to be made more visible or to be blended into the background depending upon the application and purpose of the bollard post.

Some of the key benefits of barriers made from recycled rubber tire portions include the environmental impact because large numbers of otherwise unusable tires are used that, if left in storage mounds, would pose a fire or safety hazard as well as being unsightly. In some embodiments, 75-125 tires may be used per barrier thus significantly alleviating the environmental impact of used tire storage. The cost of the tires is relatively inexpensive as opposed to the cost of concrete because the tires are readily available. Barriers using recycled tires are more durable than concrete which chips and cracks more easily. Barriers using recycled tire portions are resilient thus improving energy dispersion as concrete or metal barriers or bollards do not absorb energy. The weight of barriers similarly sized to existing barriers may be adjustable from 800-2200 lbs. as opposed to the concrete vehicle barriers which are fixed at about 2100-2200 lbs. for standard (6 foot by 3 foot by 3 foot) F and Jersey barriers.

In some embodiments, molded skin portion 201 may be made using recycled tire rubber such as crumb rubber, ground rubber, tire shreds, recycled tire with a ½" particle size down to 200 mesh size. The smaller the rubber portions, the smoother the surface of the external surface of the barrier. In alternate embodiments, instead of recycled rubber, virgin rubber, manufactured rubber, or synthetic rubbers such as Epichloridrine, Herclor, Hydrin EP Ethylene Propylene EPDM, Nordel EU Polyether Urethane FFKM Perfluorocarbon Rubber Ethylene-Propylene-Diene-Monomer (EPDM) may be used as rubber crumb portions 101. In other embodiments, plastic pellets or other plastic materials may also be used.

Binder 102 is used to bond crumb rubber portions 101. In one embodiment, about 10% binder by weight of rubber (10# rubber=1# Binder) is used to form molded skin portion 201. Binder rates may be varied depending upon product size, barrier dimensions, size of crumb rubber used, and binder manufacturer. The binder 102 activates the curing process of the molded skin material portion 201 through the addition of water/moisture/humidity, and heat. In some embodiments, about 1-2% water by weight of binder is added into the mixing/blending process. The percentage of water can be adjusted up or down.

Barriers and other molded products can be made with natural black recycled tire rubber. In some embodiments, pre-colored rubber, or painted or coated recycled rubber can be used or a colorant can be added to the recycled rubber 101 during the mixing/blending process. The percentage of colorant added to the rubber is dependent upon the color used and the particle size of rubber being used. Thus, barriers may be made in bright colors such as orange for visibility on roadways or barriers may be made to blend with the background for environmental uses such as retaining walls or rockfall barriers.

The casting mold for the molded skin portion material 201 is designed so that it can be compressed and also withstand the pressure and heat of the molding process. The top platen/lid/push plate of the mold may be pinned, bolted or fastened while pressure is maintained to the mold and the rubber material. The sides and ends of the mold open so the molded skin portion 402 can be removed from the mold. In order to create an angle or draft on the finished barrier, a lip or retainer is included on the top of the mold. This lip or retainer holds the uncompressed/loose fill recycled rubber material. As the top platen presses down into the mold the retainer allows the platen to hold to tight tolerances within the mold and platen. The molds include removable end plates or caps. The removable ends are secured through a clamp, bolt or latching system. The removable ends allow the finished product to include different connection or interlocking points and systems. The mold may be made from any suitable material such as steel, aluminum or plastic including high density polyethylene (HDPE) or high density polypropylene (HDPP) or ultra-high molecular weight polyethylene UHMW-PE.

Figure 15:
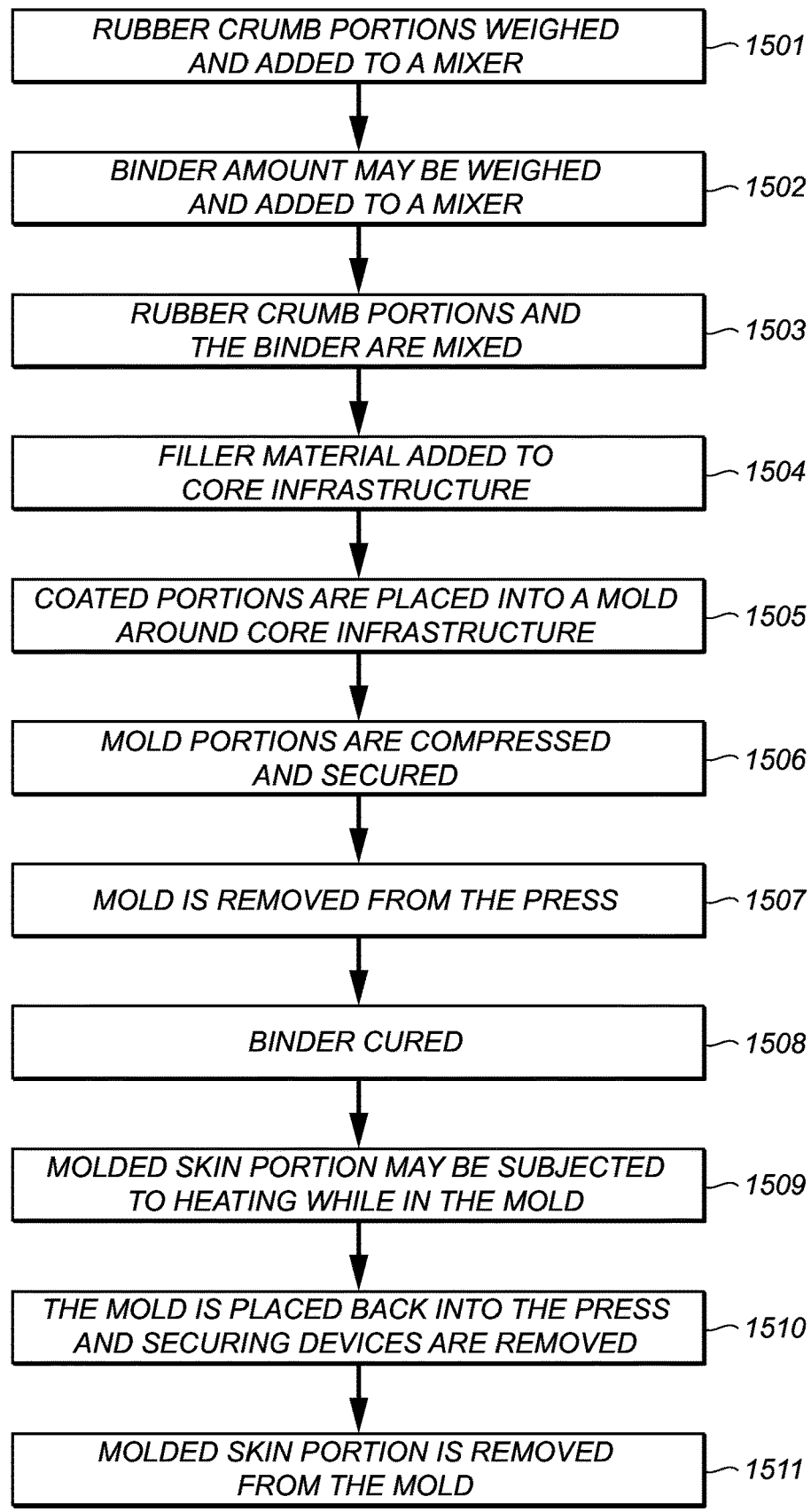
FIG. 15 is a flow chart illustrating the operations for making a molded barrier.

Referring to FIG. 15, a flow chart disclosing a compression molding method for molding recycled rubber crumb portions 101 into configurations including those disclosed above is shown. In operation 1501, rubber crumb portions 101 are weighed in an amount depending upon the desired type and size of the molded product and the portions 101 are added to a mixer. In operation 1502, a binder amount may be weighed which, in some embodiments, may be 1%-15% by weight of the weight of the rubber portions 101 and the binder is added to the mixer. In operation 1503, rubber portions 101 and the binder 102 are mixed in a mixing process along with water in an amount of about 1% by weight of binder to weight of rubber portions 101 such that rubber portions 101 are substantially coated by binder 102. The optional addition of water assists in coating rubber portions 101 with binder 102 by reducing viscosity of the binder 102 and decreases the cure time of the binder 102.

The mixing process in operation 1503 continues until rubber portions 101 are thoroughly coated with the binder 102. This may be about 5-10 minutes in some embodiments. In operation 1504, filler material 404 may be added to a core infrastructure. In operation 1505, the coated portions are placed into a mold around the core infrastructure. In operation 1506, the mold portions are compressed in a press at about 125 PSI. As discussed herein, the use of a core infrastructure allows this compression to mold skin portion 201 in a thickness of about two inches. A thicker skin portion would require more compression to achieve the same density of skin portion. During the compression process in operation 1506, the mold may be secured by affixing the mold portions together with removable pins or other securing devices.

In one embodiment, the mold may then be removed from the press in operation 1507 and the binder 102 is then allowed to cure in operation 1508. The approximate cure time may be 90-120 minutes for the polyurethane binder 102 in an ambient air curing process. In some embodiments, heat may be added to the mold after it has been removed to reduce binder curing time. In some embodiments, in optional operation 1509, the molded skin portion may be subjected to heating while remaining in the mold to reduce binder cure time. In this embodiment, the mold containing skin portion 201 is removed after the binder has cured. If the mold has been removed in operation 1507, and after curing is complete, in operation 1510, the mold is placed back into the press and the pins or other securing devices which were inserted in operation 1506 are removed and the molded skin portion 402 is removed from the mold in operation 1511. Thus, operations 1507, 1508 and 1509 may be juxtaposed and the curing of the binder in operation 1508 may be done while the mold is in the press or after it is removed from the press and heat may be added in operations 1507 and/or operation 1509.

In operation 1503, binder 102 can be applied manually through weigh and measure devices or the binder can be pumped into the mixing process through a pump. During operation 1502, the binder should cover as much surface area of the rubber particles 101 as possible. The rate of binder applied to the rubber material in the mixer can be metered through a programmable pump or a pump driven from a variable frequency drive. Pumps such as a diaphragm pump, peristaltic pump, vane pump, or equivalent will be used to meter the amount of binder/bonding agent entering the mixer.

In operation 1503, the blended material is poured directly into the mold or the blended material is augured or conveyed into the mold. The pouring is done in two separate steps. The first pour includes a specified amount of blended material that fills the bottom of the mold allowing enough void space for the core infrastructure 401 to be inserted into the mold. After the core infrastructure 401 has been placed into the mold, the second pour is made. The second pour encapsulates the core infrastructure and is made after operation 1504. The second pour will be a specified amount of material mixture 201 that will fill the sides and the top of the mold.

In operation 1504, the core infrastructure 401 is filled with 2" tire shreds or chips 101 or other material 404 as described herein. The empty core infrastructure 401 is placed under a chute connected to a surge bin and auger/conveyor. When the surge bin is activated tire shreds or chips or other filler material will be conveyed or augured to a chute, allowing filler material to fall into the containment body of core infrastructure 401. After the core infrastructure 401 has been filled, wire mesh or screen or other containing material is welded or otherwise attached onto the containment body 401 to completely enclose the filler material 404. The filler material 404 in the containment body of core infrastructure 401 must be compacted to be firm. If the core has any give or movement the shell may not mold correctly. If the core infrastructure 401 is not dense enough a void may be created inside the barrier creating weak spots in the resulting barrier.

In operation 1506, once the mold is filled and transferred to the press, pressure and heat are applied to the mold via a hydraulic compression molding press. In one embodiment, the pressure that will be applied to the mold is about 125 Pounds per Square Inch (PSI) for a two inch skin material 201. The amount of pressure may change depending upon the product/item to be molded and the thickness of the skin material 201. As discussed above, the use of containment body 401 allows thinner layers of skin material 201 to be used than would be required if skin material 201 comprised the entire thickness of the barrier. The pressure may also change based on raw materials (i.e. crumb rubber) used. The press may include heated platens on the bottom and on the top to aid in curing the binder if curing is done in the press. The temperature applied is about 250 degrees Fahrenheit. The temperature may vary depending on the materials used, humidity, ambient air temperature, etc. The heating may be adjusted up or down until desired cure time is achieved. Additional heating techniques may be used in operation 1506. For example, portable heaters may be used to heat the mold itself. Alternatively, fluid heat may be applied to the mold in such a way that heated fluid runs through the center walls or core of the mold in a controlled manner (through lines, pipes, reservoirs). If, in optional operation 1507, the mold has been removed from the press prior to curing the binder, the heat may be added to the mold itself apart from the press to accelerate the curing in operation 1508.

In optional operation 1509 where the mold is left in the press during binder curing, the curing process may be accelerated by having a controlled room and environment to maintain a desired temperature and humidity. An industrial oven or heat exchanger may be used to allow the mold to transfer heat through the oven or heat exchanger and cure the material at the same time. Enclosing the press to prevent heat from escaping around the chamber or open area of the press also may accelerate the curing process.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A barrier structure comprising:
    a rigid containment body comprising steel, the rigid containment body defining a hollow portion enclosed by the rigid containment body, the rigid containment body providing a core infrastructure;
    a filler material within the hollow portion, the filler material not compressed and having a density of 20-35 pounds per cubic foot (lb/ft$^3$), the filler material including tire shreds/chips; and
    a layer molded around the rigid containment body, the layer including recycled rubber crumb and a binder, the layer compressed against the rigid containment body, wherein the binder comprises a polyurethane resin and the layer molded around the rigid containment body has a thickness of approximately 2 inches, wherein the layer molded around the rigid containment body comprises 1% to 15% binder by weight of the recycled rubber crumb and the barrier structure further comprises 1% water by weight of the binder.

2. The barrier structure of claim 1 wherein the rigid containment body includes:
    a frame defining a space; and
    a material attached to the frame and enclosing the space.

3. The barrier structure of claim 1 wherein the filler material includes a flexible material.

4. The barrier structure of claim 3 wherein the filler material includes rubber particles.

5. The barrier structure of claim 1 wherein the layer includes an attachment portion molded therein.

6. The barrier structure of claim 5 wherein the attachment portion includes a three dimensional geometric shape protruding from a surface of the layer and a corresponding geometric cavity in a different surface of the layer.

7. The barrier structure of claim 6 wherein multiple barriers are attached to one another by the attachment portion to form a structure.

8. The barrier structure of claim 5 wherein the attachment portion includes a loop attached to the core infrastructure, the loop extending through the layer and protruding from an exterior surface of the layer.

9. The barrier structure of claim 1 wherein the layer is formed in a shape of one of a constant slope barrier, an F shaped barrier and a Jersey barrier.

10. The barrier structure of claim 1 wherein the filler material includes at least one of concrete, recycled rubber, and rocks.

11. The barrier structure of claim 1, wherein the layer has a density of 40-60 pounds per cubic foot (lb/ft$^3$).

12. The barrier structure of claim 1, wherein the binder has an agent to increase a flame resistance of the binder.

13. A molded barrier structure comprising:
    a layer of recycled rubber particles;
    a binder adhering the recycled rubber particles together to form a skin;

a rigid containment body comprising at least one of metal, plastic, composite material, concrete, pressed recycled material, and baled tires, the rigid containment body enclosing a void space, the skin formed around the rigid containment body, the rigid containment body providing a core infrastructure;

the skin including a substantially smooth exterior surface;

whereby the void space is at least partially filled with a filler material and the skin compressed against the rigid containment body, wherein the binder comprises a polyurethane resin and the skin formed around the rigid containment body has a thickness of approximately 2 inches, wherein the skin formed around the rigid containment body comprises 1% to 15% binder by weight of the recycled rubber particles and the molded barrier structure further comprises 1% water by weight of the binder.

14. The molded barrier structure of claim 11 wherein the filler material includes at least one of concrete, recycled rubber, rocks or sand.

15. The molded barrier structure of claim 13, wherein the skin has a density of 40-60 pounds per cubic foot ($lb/ft^3$).

16. The molded barrier structure of claim 13, further comprising a flame resistant coating attached to the skin.

17. A molded barrier structure comprising:
a layer of recycled rubber particles;
a binder adhering the recycled rubber particles together to form a skin;
a rigid containment body comprising at least one of metal, plastic, composite material, concrete, pressed recycled material, and baled tires, the rigid containment body enclosing a void space, the skin formed around the rigid containment body, the rigid containment body providing a core infrastructure;

the skin including a substantially smooth exterior surface;

whereby the void space is at least partially filled with a filler material and the skin compressed against the rigid containment body, wherein the binder comprises a polyurethane resin and the skin is molded around the rigid containment body, wherein the skin formed around the rigid containment body comprises 1% to 15% binder by weight of the recycled rubber particles and the molded barrier structure further comprises 1% water by weight of the binder.

* * * * *